United States Patent
Russ et al.

(10) Patent No.: US 6,171,348 B1
(45) Date of Patent: *Jan. 9, 2001

(54) BLUE DYEING MIXTURES OF FIBER-REACTIVE DYESTUFFS AND THEIR USE FOR DYEING FIBER MATERIAL CONTAINING HYDROXY AND/OR CARBOXAMIDE GROUPS

(75) Inventors: Werner Hubert Russ, Flörsheim; Andreas Von Der Eltz, Frankfurt am Main; Bengt-Thomas Gröbel, Niederems, all of (DE); Daniele Negri, Busto Arsizio (IT)

(73) Assignee: DyStar Textilfarben GmbH (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/936,822

(22) Filed: Sep. 25, 1997

(30) Foreign Application Priority Data

Sep. 30, 1996  (DE) ............... 196 40 203

(51) Int. Cl.[7] ............. C09B 67/24; D06P 1/382; D06P 1/384
(52) U.S. Cl. ................ 8/549; 8/641; 8/685; 8/543; 8/918
(58) Field of Search .............. 8/641, 543.9, 685, 8/918

(56) References Cited

U.S. PATENT DOCUMENTS

| | | | |
|---|---|---|---|
| 5,632,783 | * | 5/1997 | Krallmann et al. . |
| 5,690,698 | * | 11/1997 | Von Der Eltz et al. ......... 8/532 |
| 5,704,951 | * | 1/1998 | Negri et al. ................ 8/546 |
| 5,779,739 | | 7/1998 | Von Der Eltz et al. . |

FOREIGN PATENT DOCUMENTS

| | | | |
|---|---|---|---|
| 2142742 | | 2/1995 | (CA) . |
| 2142742 | * | 8/1995 | (CA) . |
| 668 328 | | 2/1995 | (EP) . |
| 0 735 112 | | 3/1996 | (EP) . |
| 0 730 010 | | 9/1996 | (EP) . |
| 278461 | | 10/1995 | (JP) . |
| 7-278461 | * | 10/1995 | (JP) . |
| 9-169922 | * | 12/1995 | (JP) . |
| 8-127730 | * | 5/1996 | (JP) . |

* cited by examiner

*Primary Examiner*—Margaret Einsmann
(74) *Attorney, Agent, or Firm*—Connolly Bove Lodge & Hutz LLP

(57) ABSTRACT

A dyestuff mixture containing one or more copper formazan dyestuffs of the formula (1), one or more disazo dyestuffs of the formula (2) and one or two monoazo dyestuffs of the formula (3)

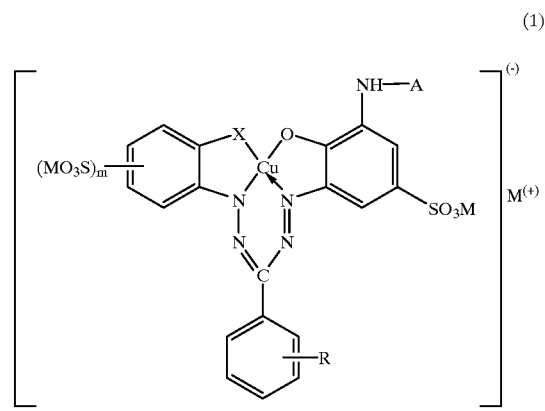

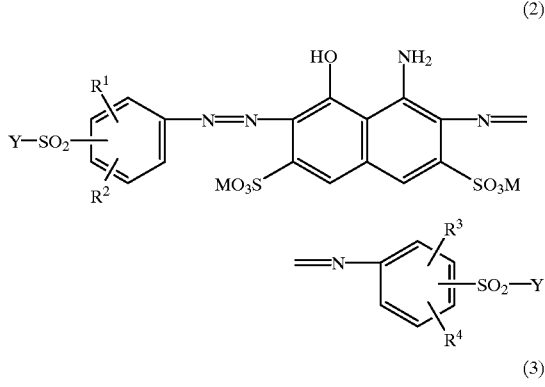

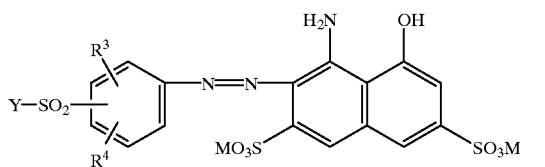

16 Claims, No Drawings

BLUE DYEING MIXTURES OF FIBER-REACTIVE DYESTUFFS AND THEIR USE FOR DYEING FIBER MATERIAL CONTAINING HYDROXY AND/OR CARBOXAMIDE GROUPS

DESCRIPTION

Blue-dyeing mixtures of fiber-reactive dyestuffs and their use for dyeing fiber material containing hydroxy and/or carboxamide groups The invention relates to the technical field of fiber-reactive dyestuffs.

In efforts to extend or supplement dyestuff ranges by modern reactive dyestuffs, limits which cannot be overcome or can be overcome only inadequately by an individual dyestuff component are encountered in many respects. To obtain certain color hues, trichromatic dyeing is used. Needless to say, there are often difficulties when dark blue reactive dyestuffs are employed, since the dyestuffs either have too high an affinity for the fiber and are exhausted too rapidly, or, in the case of copper complex formazan dyestuffs, for example, they do not have an adequate extraction from the liquor. Although blue-dyeing dyestuff mixtures that contain a copper formazan dyestuff have already been described in European Patent Application Publication No. 0 730 010 and Japanese Patent Application Publication No. Hei-7-278461, there was still the problem of discovering suitable blue-dyeing reactive dyestuffs which have balanced properties in their affinity for the fiber and in their exhaustion properties.

Mixtures of dyestuffs, corresponding to the formulae (1), (2) and (3) shown and defined below, which achieve this object have now been found with the present invention.

The present invention relates to dyestuff mixtures which comprise (contain) one or more, such as two or three, copper formazan dyestuffs of the formula (1), one or more, such as two, three or four, disazo dyestuffs of the formula (2) and one or two monoazo dyestuffs of the formula (3).

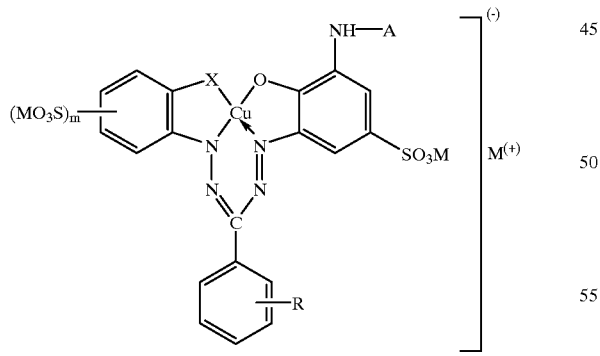

(1)

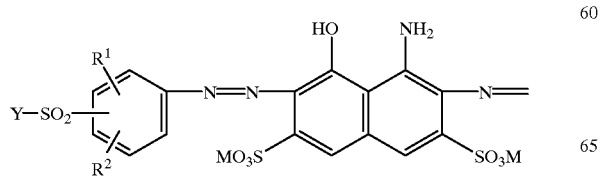

(2)

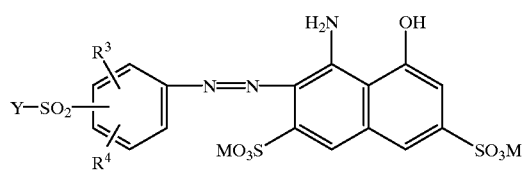

(3)

In these formulae:

M is hydrogen or an alkali metal, such as lithium, sodium and potassium;

m is the number zero or 1 (where, in the case where m is zero, this group is hydrogen);

Y is vinyl, β-chloroethyl, β-thiosulfatoethyl or β-sulfatoethyl, preferably vinyl, and in particular β-sulfatoethyl;

R is hydrogen, alkyl having 1 to 4 carbon atoms, such as methyl or ethyl, sulfo, carboxy or chlorine, preferably hydrogen or sulfo;

X is carbonyloxy of the formula —CO—O— or oxy of the formula —O— or the group —SO$_3^{(-)}$, preferably carbonyloxy;

A is a radical of the formula (a), (b) or (c)

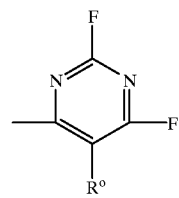

(a)

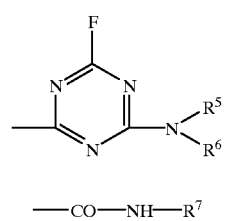

(b)

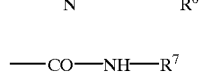

(c)

in which

R$^0$ is hydrogen or chlorine,

R$^5$ is hydrogen or, preferably, alkyl having 1 to 4 carbon atoms, such as methyl and ethyl, or, particularly preferably, phenyl, which can be substituted, such as, for example, by 1 or 2 substitutents from the group consisting of sulfo, alkyl having 1 to 4 carbon atoms, such as ethyl and, in particular, methyl, alkoxy having 1 to 4 carbon atoms, such as ethoxy and, in particular, methoxy, carboxy and halogen, such as chlorine, and of these preferably sulfo, R$^6$ is hydrogen, alkyl having 1 to 4 carbon atoms, such as methyl, ethyl and n-propyl, or preferably a group of the formula —(CH$_2$)$_n$—SO$_2$—Y in which Y has one of the abovementioned meanings and n is the number 2 or 3, or furthermore is preferably a group of the formula —$(CH_2)_n$-phenylene-$SO_2$—Y where Y and n have the abovementioned meaning, or furthermore is preferably a group of the formula —$(CH_2)_p$—B—$(CH_2)_q$—$SO_2$—Y, in which p and q, both independently of one another, are the number 2, 3 or 4, preferably 2, B is a radical of the formula —O— or —NH— and Y has one of the abovementioned meanings, and $R^7$ is a group of the formula —$(CH_2)_n$—$SO_2$—Y , in which Y has one of the abovementioned meanings and n is the number 2 or 3, preferably 2, or is a group of the formula —$(CH_2)_n$-phenylene-$SO_2$—Y , where Y and n have the abovementioned meaning;

$R^1$ is hydrogen, methyl, ethyl, methoxy or ethoxy, preferably methoxy and hydrogen, and in particular hydrogen;

$R^2$ is hydrogen, methyl, ethyl, methoxy or ethoxy, preferably hydrogen;

$R^3$ is hydrogen, methyl, ethyl, methoxy or ethoxy, preferably methoxy and hydrogen, and in particular hydrogen; and $R^4$ is hydrogen, methyl, ethyl, methoxy or ethoxy, preferably hydrogen.

The individual formula members in the formulae (1), (2) and (3) can also have the same meaning as one another in the context of their definition.

A sulfo group is a group of the formula —$SO_3M$, a carboxy group is a group of the formula —COOM, a sulfato group is a group of the formula —$OSO_3M$ and a thiosulfato group is a group of the formula —S—$SO_3M$, in each case where M has the abovementioned meaning.

The dyestuffs of the formulae (1), (2) and (3) are known, for example, from German Patents Nos. 960 534 and 965 902, U.S. Pat. Nos. 4,257,770, 4,515,598, 4,649,193 and 5,278,292, the European Patent Application Publications Nos. 0 135 040 and 0 527 164, and German Offenlegungsschrift No. 1 904 112, or can be prepared by procedures analogous to those described therein.

In the formulae (2) and (3), the group Y—$SO_2$— is preferably bonded in the meta- or para-position relative to the azo groups on the benzene radical. In formula (1) the one group $MO_3S$— is preferably bonded in the para-positions relative to the group X or the N atom of the formazan heterocyclic radical.

In general, the dyestuffs of the formulae (1), (2) and (3) are present in the mixture according to the invention in a molar mixing ratio of 20:100:0.5 to 70:40:4, preferably in a molar mixing ratio of 35:80:2 to 55:55.5 1.

Radicals of diazo components of the formulae (2) and (3) are, for example, 3-(β-sulfatoethylsulfonyl)phenyl, 4-(β-sulfatoethylsulfonyl)-phenyl, 2-methyl-5-methoxy-4-(β-sulfatoethylsulfonyl)phenyl, 2-methoxy-5-(β-sulfatoethylsulfonyl)phenyl and 2,5-dimethoxy-4-(β-sulfatoethylsulfonyl)phenyl and the vinylsulfonyl, β-chloroethylsulfonyl and β-thiosulfatoethylsulfonyl derivatives thereof, preferably 2-methoxy-5-(β-sulfatoethylsulfonyl)phenyl and 2,5-dimethoxy-4-(β-sulfatoethylsulfonyl)phenyl and in particular 3-(β-sulfatoethylsulfonyl)-phenyl and 4-(β-sulfatoethylsulfonyl) phenyl.

The dyestuffs of the formulae (1), (2) and (3) can have different fiber-reactive groups —$SO_2$—Y within the meaning of Y, in particular if the chromophore is the same. The dyestuff mixtures can comprise, in particular, dyestuffs of the same chromophore in which the fiber-reactive groups —$SO_2$—Y on the one hand are vinylsulfonyl groups and on the other hand are β-chloroethylsulfonyl or β-thiosulfatoethylsulfonyl or, preferably, β-sulfatoethylsulfonyl groups. If such a dyestuff component is present in the dyestuff mixtures in the form of a vinylsulfonyl dyestuff, the proportion of the particular vinylsulfonyl dyestuff with respect to the particular β-chloro or β-thiosulfato- or β-sulfatoethylsulfonyl dyestuff is preferably up to about 20 mol %, based on the particular dyestuff chromophore. Those dyestuff mixtures in which the proportion of vinylsulfonyl dyestuffs with respect to the β-sulfatoethylsulfonyl dyestuffs is in a molar ratio of between 2:98 and 10:90 are preferred here.

The dyestuff mixtures according to the invention can be present as a preparation in solid or liquid (dissolved) form. In general, they comprise the electrolyte salts customary in the case of water-soluble and, in particular, fiber-reactive dyestuffs, such as sodium chloride, potassium chloride and sodium sulfate, and can furthermore comprise the auxiliaries customary in commercial dyestuffs, such as buffer substances which are capable of establishing a pH in aqueous solution of between 3 and 7, such as sodium acetate, sodium borate, sodium bicarbonate, sodium dihydrogen phosphate and disodium hydrogen phosphate, and, if present in solid form, small amounts of siccatives or agents which improve the solubility, such as the known naphthalenesulfonic acid-formaldehyde condensation products, and in liquid form, such as in aqueous solution (including the content of thickeners such as are customary in printing pastes), substances which ensure the stability of these preparations, such as, for example, mold-preventing agents.

The dyestuff mixtures according to the invention are in general in the form of dyestuff powders which comprise electrolyte salts and have a total dyestuff content of 20 to 70% by weight, based on the dyestuff powder or the preparation. These dyestuff powders/preparations can furthermore comprise the buffer substances mentioned in a total amount of up to 5% by weight, based on the dyestuff powder. If the dyestuff mixtures according to the invention are present in aqueous solution, the total dyestuff content in these aqueous solutions is up to about 50% by weight, such as, for example, between 5 and 40% by weight, the electrolyte salt content in these aqueous solutions preferably being below 10% by weight, based on the aqueous solution; the aqueous solutions (liquid preparations) can as a rule comprise the buffer substances mentioned in an amount of up to 5% by weight, preferably up to 2% by weight.

The dyestuff mixtures according to the invention can be prepared in the customary manner, for example by mechanical mixing of the dyestuffs or dyestuff powders or aqueous solutions thereof. If the dyestuff mixtures according to the invention are prepared by mechanical mixing of the dyestuffs, any required standardizing agents, dust removal agents or further auxiliaries which are customary in dyeing and in the dyestuff preparations used for this purpose are added during mixing.

If aqueous dyestuff solutions of individual components (individual dyestuffs) are used as starting materials, the desired dyestuff mixture is likewise obtained in aqueous form (liquid preparation) by simple mixing, taking into account the amounts of the dyestuff solutions and the dyestuff concentrations thereof. Such aqueous dyestuff solutions of the individual components can also be synthesis solutions which are obtainable from the synthesis of the individual components. The aqueous solutions comprising the dyestuff mixtures according to the invention which are obtained in this way by mixing the individual dyestuff solutions (synthesis solutions) can then be put to use for dyeing directly as a liquid preparation, if appropriate after filtration, concentration and/or addition of a buffer or other auxiliaries. However, the pulverulent or granular dyestuff mixtures according to the invention, of the desired composition and formulation, can also be obtained from them, for example by spray drying and, if necessary, in a fluidized bed.

The dyestuff mixtures according to the invention and the dyestuffs of the formulae (1), (2) and (3) together give blue dyeings with a good color build-up and, in particular, good ease of washing out of non-fixed dyestuff portions from the dyed materials on fiber materials containing hydroxy and/or carboxamide groups by the application and fixing processes described in the art in numerous instances for fiber-reactive dyestuffs. Compared with the individual dyestuffs, the dyestuff mixture shows homogeneous exhaust and fixing properties and gives blue dyeings of constant color hue both at the start of the dyeing process and at the end of the dyeing process, which is of great importance in a continuous dyeing process in particular. The dyestuff mixture can therefore also be included in trichromic dyeing without problems.

The present invention thus also relates to the use of the dyestuff mixtures according to the invention and of the dyestuffs of the formulae (1), (2) and (3) together for dyeing (including printing and including trichromic dyeing) of fiber materials containing hydroxy and/or carboxamide groups, and to processes for dyeing such fiber materials using a dyestuff mixture according to the invention or the dyestuffs of the formulae (1), (2) and (3) together by applying the dyestuff mixture or these dyestuffs in dissolved form to the substrate and fixing the dyestuffs on the fiber by the action of an agent having an alkaline action or by heat or by both measures.

Materials containing hydroxy groups are naturally occurring or synthetic materials containing hydroxy groups, such as, for example, cellulosic fiber materials, also in the form of paper, or regenerated products thereof and polyvinyl alcohols. Cellulosic fiber materials are preferably cotton, but also other plant fibers, such as linen, hemp, jute and ramie fibers; regenerated cellulosic fibers are, for example, viscose staple or filament viscose.

Materials containing carboxamide groups are, for example, synthetic and naturally occurring polyamides and polyurethanes, in particular in the form of fibers, for example wool and other animal hair, silk, leather, polyamide 6,6, polyamide 6, polyamide 11 and polyamide 4.

The dyestuff mixtures according to the invention are used according to generally known processes for dyeing and printing fiber materials in accordance with the known application techniques for fiber-reactive dyestuffs. Since the dyestuffs of the dyestuff mixtures according to the invention have very good properties for combination with one another, the dyestuff mixtures according to the invention can also advantageously be employed in exhaust dyeing processes. Accordingly, dyeings with very good color yield and with excellent color build-up and the same hue are obtained with them, for example, on cellulosic fibers by the exhaust process from a long liquor at temperatures between 40 and 105° C., if appropriate at temperatures up to 130° C. under pressure, and if appropriate in the presence of customary dyeing auxiliaries, using acid-binding agents and, if appropriate, neutral salts, such as sodium chloride or sodium sulfate. A procedure can be followed here in which the material is introduced into the warm bath and this is gradually heated up to the desired dyeing temperature, and the dyeing process is brought to completion at this temperature. If desired, the neutral salts, which accelerate exhaustion of the dyestuffs, can also be added if appropriate to the bath only when the actual dyeing temperature has been reached.

Intense prints with well-defined contours level and a clear white ground are likewise obtained by the customary printing processes for cellulosic fibers— which can be carried out either in one phase, for example by printing with a printing paste comprising sodium bicarbonate or another acid-binding agent and the coloring agent, and by subsequent steaming at 100 to 103° C., or can be carried out in two phases, for example by printing with a neutral or weakly acid printing paste which comprises the coloring agent and subsequently fixing the print, either by passing the printed goods through a hot electrolyte-containing alkaline bath or by over-padding with an alkaline electrolyte-containing padding liquor, with subsequent batching of this treated material or subsequent steaming or subsequent treatment with dry heat. The print result depends only a little on varying fixing conditions. The degrees of fixing obtained with the dyestuff mixtures according to the invention are very high both in dyeing and in printing. If fixing is carried out by means of dry heat by the customary thermofixing processes, hot air of 120 to 200° C. is used. In addition to the customary steam of 101 to 103° C., superheated steam and pressurized steam with temperatures of up to 160° C. can also be employed.

The acid-binding agents and the agents which cause fixing of the dyestuffs to the cellulosic fibers are, for example, water-soluble basic salts of the alkali metals and the alkaline earth metals of inorganic or organic acids, as well as compounds which liberate alkali under the influence of heat. The alkali metal hydroxides and alkali metal salts of weak to moderately strong inorganic or organic acids may be mentioned in particular, the alkali metal compounds preferably meaning the sodium and potassium compounds. Such acid-binding agents are, for example, sodium hydroxide, potassium hydroxide, sodium carbonate, sodium bicarbonate, potassium carbonate, sodium formate, sodium dihdyrogen phosphate and disodium hydrogen phosphate.

By treatment of the dyestuffs of the dyestuff mixtures according to the invention with the acid-binding agents, if appropriate under the action of heat, the dyestuffs are bonded chemically to the cellulosic fiber; in particular, after the customary after-treatment by rinsing to remove non-fixed portions of dyestuff, the cellulosic dyeings show excellent wet-fastness properties, especially since the non-fixed dyestuff portions can easily be washed out because of their good solubility in cold water.

Dyeings on polyurethane and polyamide fibers are usually carried out from an acid medium. Thus, for example, acetic acid and/or ammonium sulfate and/or acetic acid and ammonium acetate or sodium acetate can be added to the dyebath, in order to obtain the desired pH. To achieve a usable levelness of the dyeing, it is advisable to add customary leveling auxiliaries, such as, for example, those based on a reaction product of cyanuric chloride with three times the molar amount of an aminobenzenesulfonic acid or aminonaphthalenesulfonic acid, or based on a reaction product of, for example, stearylamine with ethylene oxide. As a rule, the material to be dyed is introduced into the bath at a temperature of about 40° C. and is agitated therein for some time, the dyebath is then adjusted to the desired weakly acid, preferably weakly acetic acid, pH, and the actual dyeing is carried out at a temperature of between 60 and 98° C. However, the dyeings can also be carried out at the boiling point or at temperatures of up to 120° C. (under pressure).

The following Examples serve to illustrate the invention and do not limit further possibilities. The parts are parts by weight and the percentage data are percentages by weight, unless stated otherwise. Parts by weight bear the same relation to parts by volume as the kilogram to the liter.

Where the formulae of the dyestuffs are given in the form of the free acid in the Examples, the amounts parts relate to the acid form. As a rule, however, the dyestuffs are employed in the form which usually exists for water-soluble dyestuffs, as an alkali metal salt powder comprising electrolyte salts (for example comprising sodium chloride or sodium sulfate).

EXAMPLE 1

100 parts of an aqueous solution comprising 43 parts (53 mmol) of the dyestuff of the formula (A)

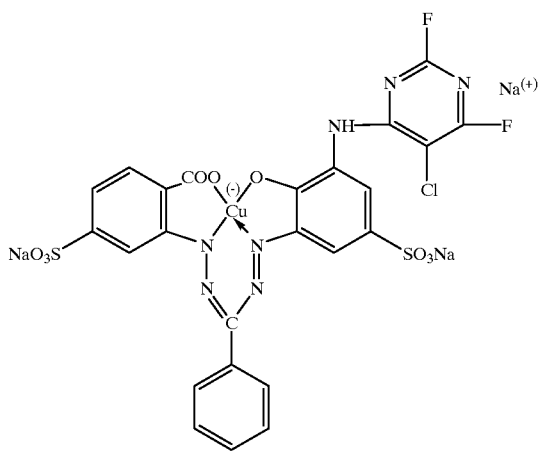

(A)

which is obtained from the synthesis of this dyestuff, after filtration, are diluted with 30 parts of water in a vessel. A mixture of 70 parts (71 mmol) of the dyestuff of the formula (B) and 1 part (1.48 mmol) of the dyestuff of the formula (C)

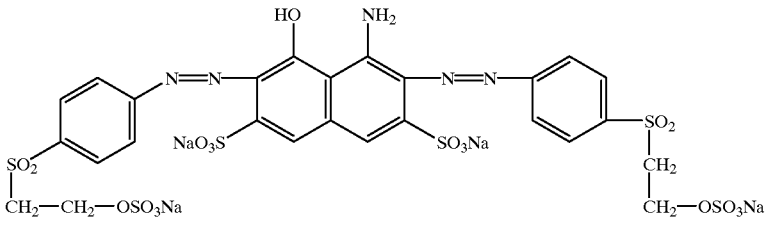

(B)

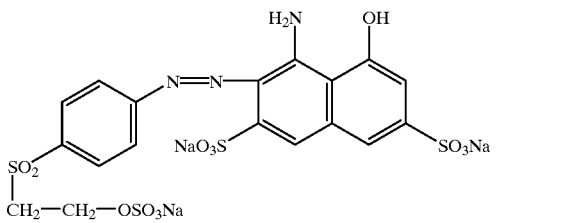

(C)

in the form of the electrolyte-containing powder is then stirred continuously into this solution. The resulting aqueous dyestuff mixture according to the invention can be put to use directly for dyeing, if appropriate after addition of customary auxiliaries, such as, for example, buffer substances or synthetic substances, or converted into the solid form by spray drying and, if appropriate granulation. The dyestuff mixture according to the invention shows, at a high fastness level, a balanced exhaustion and fixing profile when used for dyeing fiber materials mentioned in the description, such as, in particular, cellulosic fiber materials, such as cotton, by the application processes customary in the art for fiber-reactive dyestuffs. Blue dyeings of good quality are obtained.

EXAMPLE 2

160 parts of an aqueous solution, such as, for example, of an aqueous solution obtainable from the synthesis, comprising 88 parts of the disazo dyestuff of the formula (B) and 2 parts of the monoazo dyestuff of the formula (C), are mixed with 120 parts of an aqueous solution, such as, for example, an aqueous solution obtainable from the synthesis, comprising 43 parts of the copper formazan dyestuff of the formula (A) while stirring (it being possible for these solutions also to comprise electrolyte salts, such as sodium chloride, or to comprise customary auxiliaries, such as, for example, buffers and surfactant substances).

The resulting aqueous dyestuff mixture according to the invention can be put to use directly for dyeing or converted into the solid form by spray drying and, if appropriate, granulation. It gives intense, level blue dyeings and prints with good fastness properties, for example on cellulosic fiber materials, by the application and fixing processes customary in the art for fiber-reactive dyestuffs. The mixture is distinguished by a good exhaustion and fixing profile and also gives blue dyeings of constant hue in a continuous dyeing process.

EXAMPLE 3

86 parts of a dyestuff powder of the dyestuff of the formula (A) comprising electrolyte salts (predominantly containing sodium chloride) and having a dyestuff content of 50%, and 200 parts of a powder of the dyestuffs of the formulae (B) and (C) comprising electrolyte salts and having a dyestuff content of the dyestuff (B) of 47% and of the dyestuff (C) of 3% are mixed mechanically with one another, it being possible for 0.5 to 2% of a buffer, such as, for example, sodium acetate or sodium dihydrogenphosphate/ disodium hydrogen phosphate, to be added to the dyestuff powder, if appropriate. The resulting dyestuff mixture according to the invention gives intense, blue dyeings and prints of high level, the hue of which is independent of the duration of dyeing, by the application processes customary in the art for fiber-reactive dyestuffs, such as, for example, in an exhaust process.

EXAMPLES 4 to 71

Further dyestuff mixtures according to the invention comprising dyestuffs of the formulae (A-1), (B-1) and (C-1) are described in the following Tabular Examples with the aid of their components and mixing ratios. They can be prepared in the customary manner by mixing the dyestuffs, such as, for example, by one of the variants described in Examples 1 to 3. The dyestuff mixtures according to the invention give blue dyeings of good levelness by the dyeing processes customary in the art for fiber-reactive dyestuffs.

(A-1)

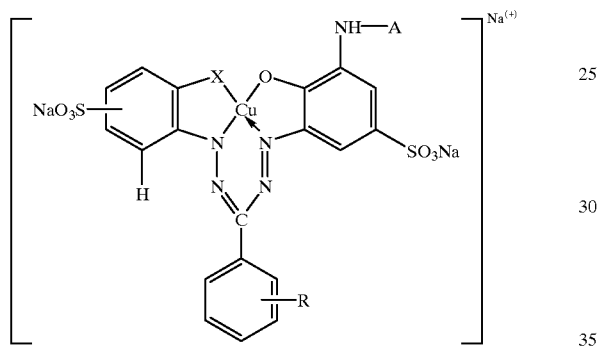

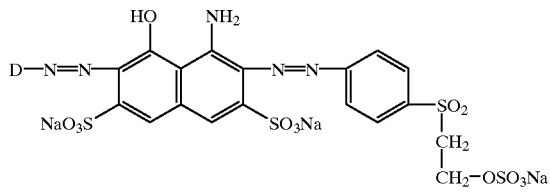
(B-1)

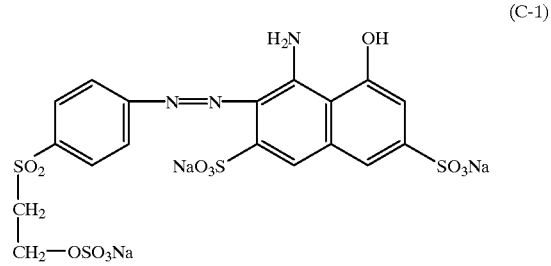
(C-1)

| Example | Position of NaO$_3$S- relative to X | Radical X | Radical A | Radical R/ position | Radical D in dyestuff (B-1) | Mixing ratio (A-1):(B-1):(C-1) in parts |
|---|---|---|---|---|---|---|
| | | | Dyestuff (A-1) | | | |
| 4 | meta | carbonyl-oxy | 2,4-difluoro-5-chloropyrimidin-6-yl | hydrogen | 4-(β-sulfoatoethylsulfonyl)-phenyl | 74:90:2.4 |
| 5 | para | carbonyl-oxy | 2,4-difluoropyrimidin-6-yl | hydrogen | 4-(β-sulfoatoethylsulfonyl)-phenyl | 71:90:1.2 |
| 6 | para | carbonyl-oxy | N-[β-(β'-sulfatoethylsulfonyl)-ethyl]amidocarbonyl | hydrogen | 4-(β-sulfoatoethylsulfonyl)-phenyl | 86:90:2 |
| 7 | para | carbonyl-oxy | 2-fluoro-4-(3'-sulfophenyl)-amino-1,3,5-triazin-6-yl | hydrogen | 4-(β-sulfoatoethylsulfonyl)-phenyl | 87:90:0.6 |
| 8 | para | carbonyl-oxy | 2-fluoro-4-(2'-sulfophenyl)-amino-1,3,5-triazin-6-yl | hydrogen | 4-(β-sulfoatoethylsulfonyl)-phenyl | 87:90:3 |
| 9 | para | carbonyl-oxy | 2-fluoro-4-N-{β-[4'-(β'-sulfatoethylsulfonyl)phenyl]-ethyl}amino-1,3,5-triazin-6-yl | hydrogen | 4-(β-sulfoatoethylsulfonyl)-phenyl | 100:90:2.2 |
| 10 | para | carbonyl-oxy | 2-fluoro-4-{N-methyl-N-[β-(β'-sulfatoethylsulfonyl)ethyl]}-amino-1,3,5-triazin-6-yl | hydrogen | 4-(β-sulfoatoethylsulfonyl)-phenyl | 94:90:3.8 |
| 11 | para | carbonyl-oxy | 2-fluoro-4-{N-ethyl-N-[β-(β'-chloroethylsulfonyl)ethyl]}-amino-1,3,5-triazin-6-yl | hydrogen | 4-(β-sulfoatoethylsulfonyl)-phenyl | 95:90:2 |
| 12 | para | carbonyl-oxy | 2-fluoro-4-N-[γ-(β'-sulfato-ethylsulfonyl)propyl]amino-1,3,5-triazin-6-yl | hydrogen | 4-(β-sulfoatoethylsulfonyl)-phenyl | 94:90:2 |
| 13 | para | carbonyl-oxy | 2-fluoro-4-N-{β-[β'-(vinylsulfonyl)ethoxy]ethyl}-amino-1,3,5-triazin-6-yl | hydrogen | 4-(β-sulfoatoethylsulfonyl)-phenyl | 87:90:2.5 |

-continued

| | Dyestuff (A-1) | | | | | |
|---|---|---|---|---|---|---|
| Example | Position of NaO$_3$S- relative to X | Radical X | Radical A | Radical R/ position | Radical D in dyestuff (B-1) | Mixing ratio (A-1):(B-1):(C-1) in parts |
| 14 | para | carbonyl-oxy | 2-fluoro-4-{N-phenyl-N-[γ-(β'-sulfatoethylsulfonyl)propyl]}-amino-1,3,5-triazin-6-yl | hydrogen | 4-(β-sulfoatoethylsulfonyl)-phenyl | 101:90:2 |
| 15 | para | carbonyl-oxy | 2-fluoro-4-{N-phenyl-N-[γ-(β'-chloroethylsulfonyl)propyl]}-amino-1,3,5-triazin-6-yl | hydrogen | 4-(β-sulfoatoethylsulfonyl)-phenyl | 95:90:2.5 |
| 16 | para | carbonyl-oxy | 2-fluoro-4-{N-phenyl-N-[β-(β'-sulfatoethylsulfonyl)ethyl]}-amino-1,3,5-triazin-6-yl | hydrogen | 4-(β-sulfoatoethylsulfonyl)-phenyl | 100:90:3 |
| 17 | para | carbonyl-oxy | 2-fluoro-4-{N-phenyl-N-[β-(vinylsulfonyl)ethyl}amino-1,3,5-triazin-6-yl | hydrogen | 4-(β-sulfoatoethylsulfonyl)-phenyl | 90:90:2 |
| 18 | para | carbonyl-oxy | 2-fluoro-4-{N-methyl-N-[β-(vinylsulfonyl)ethyl]}amino-1,3,5-triazin-6-yl | hydrogen | 4-(β-sulfoatoethylsulfonyl)-phenyl | 84:90:1.5 |
| 19 | para | carbonyl-oxy | N-[β-(β'-chloroethylsulfonyl)-ethyl]amidocarbonyl | hydrogen | 4-(β-sulfoatoethylsulfonyl)-phenyl | 89:90:1.2 |
| 20 | para | carbonyl-oxy | N-[β-(vinylsulfonyl)ethyl]-amidocarbonyl | hydrogen | 4-(β-sulfoatoethylsulfonyl)-phenyl | 85:90:2 |
| 21 | meta | carbonyl-oxy | N-[β-(vinylsulfonyl)ethyl]-amidocarbonyl | hydrogen | 4-(β-sulfoatoethylsulfonyl)-phenyl | 85:90:2 |
| 22 | meta | carbonyl-oxy | 2,4-difluoro-5-chloro-pyrimidin-6-yl | hydrogen | 2,5-dimethoxy-4-(β-sulfatoethylsulfonyl)phenyl | 74:96:2.4 |
| 23 | para | carbonyl-oxy | 2,4-difluoropyrimidin-6-yl | hydrogen | 2,5-dimethoxy-4-(β-sulfatoethylsulfonyl)phenyl | 71:96:1.2 |
| 24 | para | carbonyl-oxy | N-[β-(β'-sulfatoethylsulfonyl)-ethyl]amidocarbonyl | hydrogen | 2,4-dimethoxy-4-(β-sulfatoethylsulfonyl)phenyl | 86:96:2 |
| 25 | para | carbonyl-oxy | 2-fluoro-4-(3'-sulfophenyl)-amino-1,3,5-triazin-6-yl | hydrogen | 2,5-dimethoxy-4-(β-sulfatoethylsulfonyl)phenyl | 87:96:0.6 |
| 26 | para | carbonyl-oxy | 2-fluoro-4-(2'-sulfophenyl)-amino-1,3,5-triazin-6-yl | hydrogen | 2,5-dimethoxy-4-(β-sulfatoethylsulfonyl)phenyl | 87:96:3 |
| 27 | para | carbonyl-oxy | 2-fluoro-4-{β-[4'-(β'-sulfatoethylsulfonyl)phenyl]-ethyl}amino-1,3,5-triazin-6-yl | hydrogen | 2,5-dimethoxy-4-(β-sulfatoethylsulfonyl)phenyl | 100:96:2.2 |
| 28 | para | carbonyl-oxy | 2-fluoro-4-{N-methyl-N-[β-(β'-sulfatoethylsulfonyl)ethyl]}-amino-1,3,5-triazin-6-yl | hydrogen | 2,5-dimethoxy-4-(β-sulfatoethylsulfonyl)phenyl | 94:96:3.8 |
| 29 | para | carbonyl-oxy | 2-fluoro-4-{N-ethyl-N-[β-(β'-chloroethylsulfonyl)ethyl]}-amino-1,3,5-triazin-6-yl | hydrogen | 2,5-dimethoxy-4-(β-sulfatoethylsulfonyl)phenyl | 95:96:2 |
| 30 | para | carbonyl-oxy | 2-fluoro-4-N-[γ-(β'-sulfatoethylsulfonyl)propyl]-amino-1,3,5-triazin-6-yl | hydrogen | 2,5-dimethoxy-4-(β-sulfatoethylsulfonyl)phenyl | 94:96:2 |
| 31 | para | carbonyl-oxy | 2-fluoro-4-N-{β-[β'-(vinylsulfonyl)ethoxy]ethyl}-amino-1,3,5-triazin-6-yl | hydrogen | 2,5-dimethoxy-4-(β-sulfatoethylsulfonyl)phenyl | 87:96:2.5 |
| 32 | para | carbonyl-oxy | 2-fluoro-4-{N-phenyl-N-[γ-(β'-sulfatoethylsulfonyl)propyl]}-amino-1,3,5-triazin-6-yl | hydrogen | 2,5-dimethoxy-4-(β-sulfatoethylsulfonyl)phenyl | 101:96:2 |
| 33 | para | carbonyl-oxy | 2-fluoro-4-{N-phenyl-N-[γ-(β'-chloroethylsulfonyl)propyl]}-amino-1,3,5-triazin-6-yl | hydrogen | 2,5-dimethoxy-4-(β-sulfatoethylsulfonyl)phenyl | 95:96:2.5 |
| 34 | para | carbonyl-oxy | 2-fluoro-4-{N-phenyl-N-[β-(β'-sulfatoethylsulfonyl)ethyl]}-amino-1,3,5-triazin-6-yl | hydrogen | 2,5-dimethoxy-4-(β-sulfatoethylsulfonyl)phenyl | 100:96:3 |
| 35 | para | carbonyl-oxy | 2-fluoro-4-{N-phenyl-N-[β-(vinylsulfonyl)ethyl}amino-1,3,5-triazin-6-yl | hydrogen | 2,5-dimethoxy-4-(β-sulfatoethylsulfonyl)phenyl | 90:96:2 |
| 36 | para | carbonyl-oxy | 2-fluoro-4-{N-methyl-N-[β-(vinylsulfonyl)ethyl]}amino-1,3,5-triazin-6-yl | hydrogen | 2,5-dimethoxy-4-(β-sulfatoethylsulfonyl)phenyl | 84:96:1.5 |
| 37 | para | carbonyl-oxy | N-[β-(β'-chloroethylsulfonyl)-ethyl]amidocarbonyl | hydrogen | 2,5-dimethoxy-4-(β-sulfatoethylsulfonyl)phenyl | 89:96:1.2 |
| 38 | para | carbonyl-oxy | N-[β-(vinylsulfonyl)ethyl]amido-carbonyl | hydrogen | 2,5-dimethoxy-4-(β-sulfatoethylsulfonyl)phenyl | 85:96:2 |
| 39 | meta | carbonyl-oxy | N-[β-(vinylsulfonyl)ethyl]amido-carbonyl | hydrogen | 2,5-dimethoxy-4-(β-sulfatoethylsulfonyl)phenyl | 85:96:2 |
| 40 | meta | carbonyl-oxy | 2,4-difluoro-5-chloropyrimidin-6-yl | hydrogen | 2-methoxy-5-(β-sulfatoethylsulfonyl)phenyl | 74:93:2.4 |

-continued

| | | Dyestuff (A-1) | | | | |
|---|---|---|---|---|---|---|
| Example | Position of NaO₃S- relative to X | Radical X | Radical A | Radical R/ position | Radical D in dyestuff (B-1) | Mixing ratio (A-1):(B-1):(C-1) in parts |
| 41 | para | carbonyl-oxy | 2,4-difluoropyrimidin-6-yl | hydrogen | 2-methoxy-5-(β-sulfatoethylsulfonyl)phenyl | 71:93:1.2 |
| 42 | para | carbonyl-oxy | N-[β-(β'-sulfatoethylsulfonyl)-ethyl]amidocarbonyl | hydrogen | 2-methoxy-5-(β-sulfatoethylsulfonyl)phenyl | 86:93:2 |
| 43 | para | carbonyl-oxy | 2-fluoro-4-(3'-sulfophenyl)-amino-1,3,5-triazin-6-yl | hydrogen | 2-methoxy-5-(β-sulfatoethylsulfonyl)phenyl | 87:93:0.6 |
| 44 | para | carbonyl-oxy | 2-fluoro-4-(2'-sulfophenyl)-amino-1,3,5-triazin-6-yl | hydrogen | 2-methoxy-5-(β-sulfatoethylsulfonyl)phenyl | 87:93:3 |
| 45 | para | carbonyl-oxy | 2-fluoro-4-N-{β-[4'-(β'-sulfatoethylsulfonyl)phenyl]-ethyl}amino-1,3,5-triazin-6-yl | hydrogen | 2-methoxy-5-(β-sulfatoethylsulfonyl)phenyl | 100:93:2.2 |
| 46 | para | carbonyl-oxy | 2-fluoro-4-{methyl-N-[β-(β'-sulfatoethylsulfonyl)ethyl]}-amino-1,3,5-triazin-6-yl | hydrogen | 2-methoxy-5-(β-sulfatoethylsulfonyl)phenyl | 94:93:3.8 |
| 47 | para | carbonyl-oxy | 2-fluoro-4-{N-ethyl-N-[β-(β'-chloroethylsulfonyl)ethyl]}-amino-1,3,5-triazin-6-yl | hydrogen | 2-methoxy-5-(β-sulfatoethylsulfonyl)phenyl | 95:93:2 |
| 48 | para | carbonyl-oxy | 2-fluoro-4-N-[γ-(β'-sulfatoethylsulfonyl)propyl]-amino-1,3,5-triazin-6-yl | hydrogen | 2-methoxy-5-(β-sulfatoethylsulfonyl)phenyl | 94:93:2 |
| 49 | para | carbonyl-oxy | 2-fluoro-4-N-{β-[β'-(vinylsulfonyl)ethoxy]ethyl}-amino-1,3,5-triazin-6-yl | hydrogen | 2-methoxy-5-(β-sulfatoethylsulfonyl)phenyl | 87:93:2.5 |
| 50 | para | carbonyl-oxy | 2-fluoro-4-{N-phenyl-N-[γ-(β'-sulfatoethylsulfonyl)propyl]}-amino-1,3,5-triazin-6-yl | hydrogen | 2-methoxy-5-(β-sulfatoethylsulfonyl)phenyl | 101:93:2 |
| 51 | para | carbonyl-oxy | 2-fluoro-4-{N-phenyl-N-[γ-(β'-chloroethylsulfonyl)propyl]}-amino-1,3,5-triazin-6-yl | hydrogen | 2-methoxy-5-(β-sulfatoethylsulfonyl)phenyl | 95:93:2.5 |
| 52 | para | carbonyl-oxy | 2-fluoro-4-{N-phenyl-N-[β-(β'-sulfatoethylsulfonyl)ethyl]}-amino-1,3,5-triazin-6-yl | hydrogen | 2-methoxy-5-(β-sulfatoethylsulfonyl)phenyl | 100:93:3 |
| 53 | para | carbonyl-oxy | 2-fluoro-4-{N-phenyl-N-[β-(vinylsulfonyl)ethyl]}amino-1,3,5-triazin-6-yl | hydrogen | 2-methoxy-5-(β-sulfatoethylsulfonyl)phenyl | 90:93:2 |
| 54 | para | carbonyl-oxy | 2-fluoro-4-{N-methyl-N-[β-(vinylsulfonyl)ethyl]}amino-1,3,5-triazin-6-yl | hydrogen | 2-methoxy-5-(β-sulfatoethylsulfonyl)phenyl | 84:93:1.5 |
| 55 | para | carbonyl-oxy | N-[β-(β'-chloroethylsulfonyl)-ethyl]amidocarbonyl | hydrogen | 2-methoxy-5-(β-sulfatoethylsulfonyl)phenyl | 89:93:1.2 |
| 56 | para | carbonyl-oxy | N-[β-(vinylsulfonyl)ethyl]amido-carbonyl | hydrogen | 2-methoxy-5-(β-sulfatoethylsulfonyl)phenyl | 85:93:2 |
| 57 | meta | carbonyl-oxy | N-[β-(vinylsulfonyl)ethyl]amido-carbonyl | hydrogen | 2-methoxy-5-(β-sulfatoethylsulfonyl)phenyl | 84:92:2 |
| 58 | meta | carbonyl-oxy | 2,4-difluoro-5-chloropyrimidin-6-yl | hydrogen | [5-(5'-chloro-2',6'-difluoro-pyrimidin-4'-ylamino)-2"-sulfophenyl]-1-yl | 74:96:2.4 |
| 59 | para | carbonyl-oxy | 2,4-difluoropyrimidin-6-yl | hydrogen | [5-(5'-chloro-2',6'-difluoro-pyrimidin-4'-ylamino)-2"-sulfophenyl]-1-yl | 71:96:1.2 |
| 60 | para | carbonyl-oxy | N-[β-(β'-sulfatoethylsulfonyl)-ethyl]amidocarbonyl | hydrogen | [5-(5'-chloro-2',6'-difluoro-pyrimidin-4'-ylamino)-2"-sulfophenyl]-1-yl | 86:96:2 |
| 61 | para | carbonyl-oxy | 2-fluoro-4-(3'-sulfophenyl)-amino-1,3,5-triazin-6-yl | hydrogen | [5-(5'-chloro-2',6'-difluoro-pyrimidin-4'-ylamino)-2"-sulfophenyl]-1-yl | 87:96:0.6 |
| 62 | para | carbonyl-oxy | 2-fluoro-4-(3'-sulfophenyl)-amino-1,3,5-triazin-6-yl | hydrogen | [5-(5'-chloro-2',6'-difluoro-pyrimidin-4'-ylamino)-2"-sulfophenyl]-1-yl | 65:90:1 |
| 63 | para | carbonyl-oxy | 2-fluoro-4-N-{β-[β'-(vinylsulfonyl)ethoxy]ethyl}-amino-1,3,5-triazin-6-yl | hydrogen | [5-(5'-chloro-2',6'-difluoro-pyrimidin-4'-ylamino)-2"-sulfophenyl]-1-yl | 20:80:2 |
| 64 | para | carbonyl-oxy | 2-fluoro-4-{N-phenyl-N-[β-β'-sulfatoethylsulfonyl)ethyl}-amino-1,3,5-triazin-6-yl | hydrogen | [5-(5'-chloro-2',6'-difluoro-pyrimidin-4'-ylamino)-2"-sulfophenyl]-1-yl | 33:90:1 |
| 65 | para | carbonyl-oxy | 2-fluoro-4-(3'-sulfophenyl)-amino-1,3,5-triazin-6-yl | hydrogen | [5-(5'-chloro-2',6'-difluoro-pyrimidin-4'-ylamino)-2"-sulfophenyl]-1-yl | 65:96:1 |
| 66 | para | carbonyl- | 2-fluoro-4-N-{β-[β'- | hydrogen | [5-(5'-chloro-2',6'-difluoro- | 20:84:2 |

-continued

| | Position of NaO₃S- relative | | | Dyestuff (A-1) | | Mixing ratio |
|---|---|---|---|---|---|---|
| Example | to X | Radical X | Radical A | Radical R/ position | Radical D in dyestuff (B-1) | (A-1):(B-1):(C-1) in parts |
| | | oxy | (vinylsulfonyl)ethoxy]ethyl}- amino-1,3,5-triazin-6-yl | | pyrimidin-4'-ylamino)-2"- sulfophenyl]-1-yl | |
| 67 | para | carbonyl- oxy | 2-fluoro-4-{N-phenyl-N-[β-(β'- sulfatoethylsulfonyl)ethyl}- amino-1,3,5-triazin-6-yl | hydrogen | [5-(5'-chloro-2',6'-difluoro- pyrimidin-4'-ylamino)-2"- sulfophenyl]-1-yl | 33:96:1 |
| 68 | para | carbonyl- oxy | 2-fluoro-4-(3'-sulfophenyl)- amino-1,3,5-triazin-6-yl | hydrogen | [5-(5'-chloro-2',6'-difluoro- pyrimidin-4'-ylamino)-2"- sulfophenyl]-1-yl | 65:93:1 |
| 69 | para | carbonyl- oxy | 2-fluoro-4-N-{β-[β'- (vinylsulfonyl)ethoxy]ethyl}- amino-1,3,5-triazin-6-yl | hydrogen | [5-(5'-chloro-2',6'-difluoro- pyrimidin-4'-ylamino)-2"- sulfophenyl]-1-yl | 20:83:2 |
| 70 | para | carbonyl- oxy | 2-fluoro-4-{N-phenyl-N-[β-β'- sulfatoethylsulfonyl)ethyl}- amino-1,3,5-triazin-6-yl | hydrogen | [5-(5'-chloro-2',6'-difluoro- pyrimidin-4'-ylamino)-2"- sulfophenyl]-1-yl | 33:93:1 |
| 71 | para | carbonyl- oxy | 2-fluoro-4-(3'-sulfophenyl)- amino-1,3,5-triazin-6-yl | hydrogen | [5-(5'-chloro-2',6'-difluoro- pyrimidin-4'-ylamino)-2"- sulfophenyl]-1-yl | 55:93:1 |

What is claimed is:

1. A dyestuff mixture comprising one or more copper formazan dyestuffs of the formula (1), one or more disazo dyestuffs of the formula (2) and one or two monoazo dyestuffs of the formula (3)

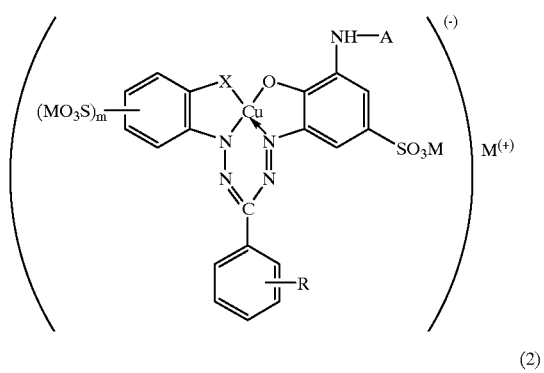

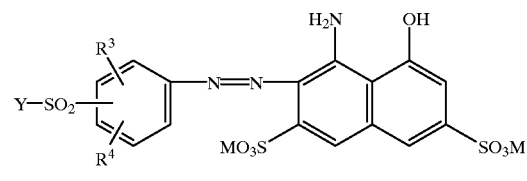

in which:

M is the hydrogen or an alkali metal;

m is the number zero or 1;

Y is vinyl, β-chloroethyl, β-thiosulfatoethyl or β-sulfatoethyl;

R Is hydrogen, alkyl having 1 to 4 carbon atoms, sulfo, carboxy or chlorine;

X is carbonyloxy of the formula —CO—O— or oxy of the formula —O— or the group —SO₃$^{(-)}$—, A is the radical of the formula (a) or (b)

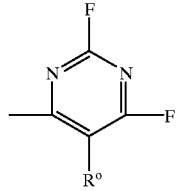

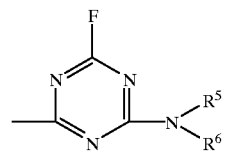

in which

R⁰ is hydrogen or chlorine,

R⁵ is hydrogen or alkyl having 1 to 4 carbon atoms, or is phenyl unsubstituted or substituted, R⁶ is hydrogen, alkyl having 1 to 4 carbon atoms or a group of the formula —(CH$_2$)$_n$—SO$_2$—Y, in which Y has one of the abovementioned meanings and n is the number 2 or 3, or is a group of the formula —(CH$_2$)$_n$-phenylene-SO$_2$—Y, where Y and n have the abovementioned meaning, or is a group of the formula —(CH$_2$)$_p$—B—(CH$_2$)$_q$—SO$_2$—Y, in which p and q, both independently of one another, are the number 2, 3 or 4, B is a radical of the formula —O— or —NH— and Y has one of the abovementioned meanings, and R¹ is hydrogen, methyl, ethyl, methoxy or ethoxy;

R² is hydrogen, methyl, ethyl, methoxy or ethoxy;

R³ is hydrogen, methyl, ethyl, methoxy or ethoxy;

R⁴ is hydrogen, methyl, ethyl, methoxy or ethoxy.

2. A dyestuff mixture as claimed in claim 1, wherein R¹ and R³ independently of one another are each methoxy or hydrogen and R² and R⁴ are each hydrogen.

3. A dyestuff mixture as claimed in claim 1, wherein R¹, R², R³ and R⁴ are each hydrogen.

4. A dyestuff mixture as claimed in claim 1, wherein A is a radical of the formula (b)

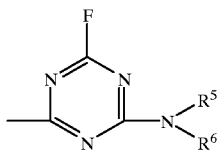

(b)

in which R⁵ is phenyl, unsubsituted or substituted by 1 or 2 substituents selected from the group consisting of sulfo, alkyl having 1 to 4 carbon atoms, alkoxy having 1 to 4 carbon atoms, carboxy and halogen.

5. A dyestuff mixture as claimed in claim 4, wherein R⁶ is a group of the formula —(CH$_2$)$_n$—SO$_2$—Y in which Y is vinyl, β-chloroethyl, β-thiosulfatoethyl or β-sulfatoethyl and n is 2 or 3.

6. A dyestuff mixture as claimed in claim 4, wherein R⁶ is a group of the formula —(CH$_2$)$_n$-phenylene-SO$_2$—Y in which Y is vinyl, β-chloroethyl, β-thiosulfatoethyl or β-sulfatoethyl and n is 2 or 3.

7. A dyestuff mixture as claimed in claim 4, wherein R⁶ is a group of the formula —(CH$_2$)$_p$—B—(CH$_2$)$_q$—SO$_2$—Y in which Y is vinyl, β-chloroethyl, β-thiosulfatoethyl or β-sulfatoethyl, B is a group —O— or —NH—, p is 2, 3 or 4 and q is 2, 3 or 4.

8. A dyestuff as claimed in claim 1, wherein R is hydrogen, alkyl having 1 to 4 carbon atoms, sulfo, carboxy or chlorine.

9. A dyestuff mixture as claimed in claim 1, wherein the dyestuffs of the formulae (1), (2) and (3) are present in the mixture in a molar mixing ratio of 20:100:0.5 to 70:40:4.

10. A dyestuff mixture as claimed in claim 1, wherein the dyestuffs of the formula (1), (2) and (3) are present in the mixture in a molar mixing ratio of 35: 80:2 to 55:55:1.

11. A dyestuff mixture as claimed in claim 1, wherein Y is in each case independently of one another vinyl or β-sulfatoethyl.

12. A dyestuff mixture as claimed in claim 5, wherein Y is in each case independently of one another vinyl or β-sulfatoethyl.

13. A dyestuff mixture as claimed in claim 6, wherein Y is in each case independently of one another vinyl or β-sulfatoethyl.

14. A dyestuff mixture as claimed in claim 7, wherein Y is in each case independently of one another vinyl or β-sulfatoethyl.

15. A process for dyeing fiber material containing hydroxy and/or carboxamide groups, in which dyestuffs are applied in dissolved form to the material and these are fixed on the material by means of heat or with the aid of an agent having an alkaline action or with the aid of both measures, which comprises employing as dyestuffs a dyestuff mixture as claimed in claim 1 or dyestuffs (1), (2) and (3) of claim 1 together.

16. The dyestuff mixture as claimed in claim 8, wherein Y is in each case independently of one another vinyl or β-sulfatoethyl.

* * * * *